Sept. 14, 1965
R. RAFFAETA
3,206,487
PROCESS FOR THE CONTINUOUS REMOVAL
OF BREAK (MUCILAGINOUS PRODUCTS)
FROM, AND PURIFICATION
OF, VEGETABLE OILS
AND FATS
Filed Jan. 29, 1962
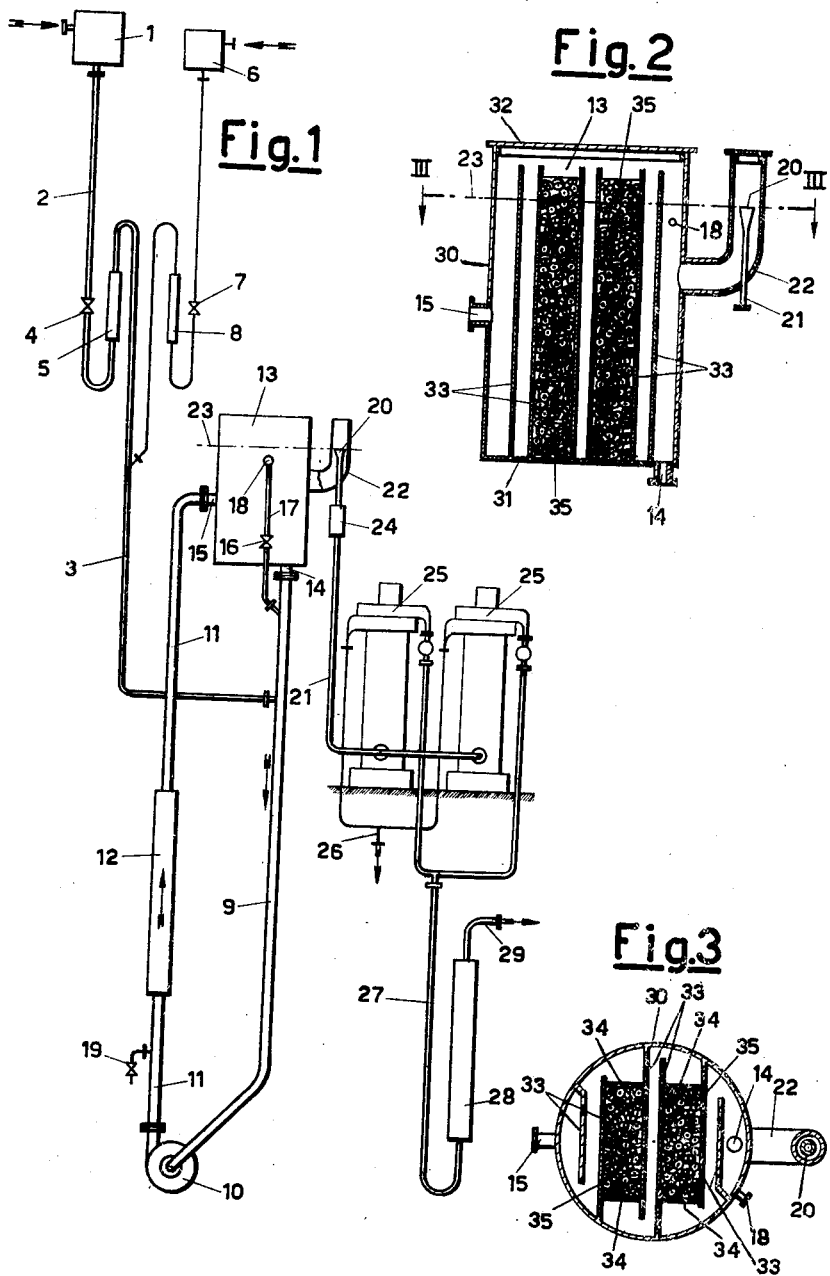
INVENTOR:
RENATO RAFFAETA
BY Squire + Olcott
ATTORNEYS.

United States Patent Office 3,206,487
Patented Sept. 14, 1965

3,206,487
PROCESS FOR THE CONTINUOUS REMOVAL OF BREAK (MUCILAGINOUS PRODUCTS) FROM, AND PURIFICATION OF, VEGETABLE OILS AND FATS
Renato Raffaeta, Piazza S. Agostino 6, Milan, Italy
Filed Jan. 29, 1962, Ser. No. 170,312
Claims priority, application Italy, Feb. 4, 1961, 2,007/61
6 Claims. (Cl. 260—428)

The present invention relates to a process for the continuous removal of break or mucilaginous products from, and the purification of, vegetable oils and fats.

In order to place this process in its correct position in the broad scheme of the treatment of oils and fats starting from crude oil and going up to purified oil, it should first of all be stated that the removal of break in general comes before all the other treatments.

A typical treatment scheme comprises in the first place break removal (demucilaginization) then deacidification with alkalis, then decolouring with adsorbents, and finally deodorization.

It is manifest, particularly in continuous processes for the treatment of oils, that the removal of break is practically indispensable because, if the break is not removed, there will be considerable losses of neutral oil in the following stage of deacidification with alkalis.

As is known, mucilaginous products consist for the most part of protein or albuminoid substances, or phosphatids, sometimes, but not always accompanied by other impurities of a colloidal nature, and the separation thereof from oils has always presented a difficulty; for this reason, the solutions of the problem of how to remove break from vegetable oils and fats, devised by the prior art, were many and diverse.

Without entering into the merits of the numerous processes proposed—essentially for reasons of brevity since this art is highly developed and the literature on the subject somewhat copious—we will confine ourselves here to noting that, in the course of time, methods involving the use of hydrocarbon solvents, aliphatic solvents, whether or not aqueous, and also saline or other precipitating agents, have been proposed for the removal of mucilaginous products.

Mucilaginous products, since they consist mainly of gum resins, protein substances, glucosids and hydrosoluble or hydratable substances in general, give rise to several troubles both during the subsequent working of the oil and in the practical use thereof. These troubles may be briefly listed as: clouding, precipitation, hydrolysis, oxidation and other changes of a chemical and physico-chemical nature. In addition, because of their colloidal nature, mucilaginous products hamper the subsequent refining stage because they produce stable emulsions during deacidification with alkalis and hence cause heavy entrainment of neutral oil into the soapstocks and furthermore considerably reduce the adsorbing action of the active earths and carbons used in the decolouring stage.

Some processes, for example that disclosed in U.S. Patent 2,319,970 of May 25, 1943, exploit the affinity of mucilaginous substances for water and consist in the mixing with the crude fat of small quantities of water, the water never exceeding one or two percent of the quantity of crude oil or fat (cf. U.S. Patent 2,319,970, page 1, line 34, r.h. col.), whereafter demucilaginization proper is carried out by means of a saline precipitant. It can therefore be stated that, in the processes such as the one briefly summarized hereinabove, the use of water was very slight and hydration of mucilaginous products was reduced to a minimum which was then thought essential in order to avoid, amongst other things, the expense of heating huge quantities of water and the separation in a centrifuge or by some other method of the excess water. The use of a saline precipitant is also a drawback and introduces a supplementary stage of working and hence additional expense. With all this, the removal of break carried out according to any process of the prior art is never complete because it has been found, in the practical operation of these processes, that at least 15–20% of the break remains in the oil.

The present invention proposes a process of continuous hydration according to which the break is completely hydrated and hence easily separated from the liquid or liposoluble phase of the oil by a simple physical separation. In brief, the process of break removal according to the present invention solves the problem of eliminating mucilaginous products with purely physical methods, the use of any saline chemical reagent, inorganic or organic, being absolutely excluded.

It is not necessary to draw attention to the considerable technical and economic progress that follows therefrom, both as regards the facility of working and as regards the quality of the finished purified oil or fat.

The process for the removal of break from vegetable oils and fats according to the present invention is characterized in that it comprises the operations of preparing a mixture of water and oil composed of at least one part by volume of water for each part by volume of oil, the introduction of said mixture into a closed circuit comprising a pump, a heater for said mixture, a decanting recipient and connecting pipelines between said pump and said heater, said heater and said decanting recipient, and said decanting recipient and said pump, causing said mixture to circulate continuously in said closed circuit until the mucilaginous products are completely hydrated, and discharging the aqueous phase containing the hydrated mucilaginous products, after decantation.

In order to carry out the process hereinabove disclosed, normal oil refinery equipment may in general be used; what is essential is that there by a static separator, continuously fed and continuously discharged, to draw off the continuously flowing stream of a mixture wherefrom it will then be possible to separate, e.g. with a centrifuge, the aqueous phase containing the hydrated mucilaginous products, and the demucilaginated lipid phase.

In the static separator there is a gravimetric classification of emulsions of water and oil, so that in the topmost part of the separator there will be a prevalence of the oil phase, whilst in the bottom part thereof there will be a prevalence of the aqueous phase containing most of the hydrated mucilaginous products.

Therefore, for every cycle run through by a discrete portion of water-oil mixture in the closed circuit hereinabove described, an emulsion will be formed through the action of the pump, and in the static separator the emulsion will be resolved into the aforesaid layers of different composition.

When the mucilaginous products have been completely hydrated, the pump stops and, after allowing the oil and water layers to decant in the separator, the aqueous phase can be discharged first, followed by the demucilaginated oil.

What has been thus far disclosed relates to the discontinuous operation of the process: from the examples it will appear manifestly that, in the practical embodiment of the process, it will be necessary to provide for a continuous feed of water and oil (preferably more oil than water) into said closed circuit, whilst discharging, also continuously, from the separator, mixtures richer in oil than in water which will then be sent for centrifugation, thus ensuring uninterrupted working.

In order to illustrate the process of the invention visually more fully, reference will be made to the accompanying drawings which represent equipment recommended for the purpose, but not necessarily the only equipment suitable for the purpose.

In the drawings:

FIG. 1 is a very schematic and simplified representation of the equipment suitable for the purpose, and from this figure the salient steps of the process will be appreciated with the aid of the description which will now follow;

FIG. 2 shows a vertical cross-section of the static separator or selector recommended for separating the aqueous phase containing the hydrated mucilaginous products, from the demucilaginated lipid phase; and FIG. 3 shows a cross-section taken along the line III—III of FIG. 2.

The figures of the accompanying drawings will serve as a useful commentary on the example which will now be given.

The process will be described pari passu with the equipment so as to present a brief but complete picture of the development of the process.

Reference will now be made essentially to FIG. 1 of the accompanying drawings.

EXAMPLE 1

A vegetable oil or fat with mucilaginous impurities of varying kinds is fed from a constant level tank 1 through a pipeline 2 to a collecting constant-flow pipeline 3, the flow being measured continuously by one of the usual flow meters, indicated schematically at 5, and tap 4.

Water is inducted into the collecting tube 3 in a continuous stream of constant flow from another constant level tank 6. The flow of water is regulated by means of a flow meter 8 and a tap 7, or by any other means suitable for the purpose.

From collecting pipe 3, the mixture of oil and water, consisting in the case under examination of a continuous flow of 2000 parts by volume per hour of crude peanut oil extracted with hexane and having a phosphated content (by weight) of 0.70%, and of a continuous flow of 400 parts by volume per hour of water, is continuously introduced into the suction conduit 9 of a centrifugal pump 10 which is clearly visible at the bottom of FIG. 1. Pump 10 is made to circulate with a flow by volume of 50,000 parts of water-oil mixture per hour: this latter mixture will be composed of about equal circulating volumes of water and oil, and will circulate in a closed circuit comprising pump 10, tube nest heater 12 and separator 13. From the latter the final mixture of water and mucilaginous products, and demucilaginated oil, is continuously discharged as will now be more fully described.

Heater 12 heats the circulating mixture to about 85° C. The suction line 9 of pump 10 is attached to the bottom of separator 13 with a fitting 14, whilst delivery line 11 enters separator 13 at about half-way up the height thereof and at a fitting 15.

The composition of the mixture circulating in the closed circuit can be adjusted by means of a valve 16 on a pipe 17; said pipe is joined by fitting 18 to the highest part of selector 13.

If a stream of mainly aqueous mixture enters line 9 from fitting 14, whilst an adjustable flow of a mixture consisting of fat or oil and little water comes thereinto from pipe fitting 18, it is evident that the composition of the mixture can be appropriately adjusted to remain within the limits hereinabove stated, which have been found in practice to be those which give the best results.

The composition of the mixture also varies according to the flow inducted from collector pipe 3 already referred to, and this can also be controlled by taking samples thereof from time to time from a tap 19 placed on the delivery side of pump 10. Pump 10 renders homogeneous all the various flows arriving in pipeline 9.

The mixture of water and oil, or, more precisely, the mixture of water containing the completely hydrated mucilaginous products, and demucilaginated oil, is discharged from overflow 20 of pipe 21.

Overflow 20 extends outside an elbow tube 22 and determines the level 23 of the liquid, also inside the separator 13. The conditioner 24 is a generally cylindrical body filled with an inert filling material, and serves as a supplementary means for breaking the emulsion coming from 13.

The hydrated mixture is directed to centrifugal separators, like 25, through a pipe 21.

The aqueous phase is separated by the centrifugal separators 25 and discharged from conduit 26: this aqueous phase contains the hydrated mucilaginous products and the hydration thereof has been effected in a complete manner by the continuous recycling in the circuit 10–11–12–15–13–14–9–10.

Each time the mixture travelled round said circuit, centrifugal pump 10 formed an emulsion of water and oil, thus considerably increasing the contact surface between the water and the mucilaginous products: it is manifest that the oil, or rather its lipid phases, is not in any manner influenced by this hydration treatment, thanks to the known insolubility of lipids in water. The oil, purified from mucilaginous products, passes to the cooler 28 through pipe 27, and is then discharged from pipe 29 at a temperature in the neighbourhood of 35° C.

As already pointed out, FIGS. 2 and 3 represent respectively an elevation cross-section and a diametrical cross-section of selector 13.

The selector consists of a vertical cylindrical shell 30 with a flat bottom 31, and is closed by a lid 32.

Inside the apparatus there are six baffles 33 which oblige the mixture entering at 15 and leaving at 14 and 18 to follow a slow sinuous path since four transverse perforated walls 34 define two chambers 35 (see FIG. 3) which are full of filtering material such as Raschig rings or the like. This variable and sinuous path is of great assistance in breaking up the oil-water emulsion, and thereby there is obtained in selector 13 a separation by gravity of heavier mixture layers at the bottom and lighter ones at the top.

It has already been explained how the circulation in a closed system enables the mucilaginous products to be completely hydrated: this has been confirmed by chemical analysis of the demucilaginated oil.

In the case now under examination—peanut oil with a phosphatic content of 0.70% by weight of the crude oil—it was found that, at the end of the operation, the phosphatid content had been reduced to 0.05%.

In other words, the phosphatid content at the end of the operation was about $1/14$ of the initial quantity thereof, that is to say 7.2% of the quantity of phosphatids initially present. This result constitutes a remarkable advance over the technique of the prior art, since previous break-removing processes still leave at least 15% of the initial quantity of phosphatids.

The fat substance content of the mucilaginous products extracted is about 28%: this result corresponds roughly with the results obtained by conventional processes, but it should be observed that the fat content of the hydrated mucilaginous products contained some oxy-acids that are insoluble in petroleum ether, and a number of peroxides higher than those of the starting fat substance (peanut oil). The demucilaginated oil had a residual humidity of 0.4% and this shows that the breaking of the emulsions in selector 13 and conditioner 24 was complete.

EXAMPLE 2

A grapeseed oil extracted with hexane was subjected to a process involving a series of operations substantially the same as those described in Example 1.

Flows of 2000 litres per hour of oil and 200 litres per hour of water were used.

The mucilaginous content, which was initially 0.12% went down to 0.02% after the completion of the operation. The temperature of treatment in heater 12 (FIG. 1) was in this case 70° C.

EXAMPLE 3

The object of this example is to show in outline that the process of break removal according to the present invention does not involve any appreciable structural alteration of the fats treated thereby.

Olive oil was treated, substantially in the conditions of Example 1, with a recycling temperature of 55° C., an oil flow of 2000 litres per hour and a water flow of 100 litres per hour.

The crude and demucilaginated oil were subjected to ultra-violet spectrophotometric examination.

The following results were obtained:

| Absorption constant | Crude oil | Demucilaginated oil |
|---|---|---|
| 232 Ångstrom | 1.870 | 1.800 |
| 270 Ångstrom | 0.245 | 0.241 |

It will easily be seen that the variations are really insignificant, and it can therefore be stated that the break removal process according to the invention involves no structural alterations worthy of note.

The examples given hereinabove are ample proof of the advantages that can be obtained with the process according to the invention: it is manifest that the process in question can be applied successfully to any vegetable oil that it is desired to free from mucilaginous products contained therein.

I claim:
1. A process for the purification of vegetable oils which comprises the steps of:
   (a) confining a mixture of about equal volumes of oil and water in a closed circuit;
   (b) continuously circulating said mixture in said closed circuit;
   (c) continuously emulsifying said mixture during the course of its circulation through said closed circuit;
   (d) continuously removing oil and water from said closed circuit;
   (e) introducing oil and water into said closed circuit at a total flow rate equal to the total flow rate at which oil and water are removed therefrom; and
   (f) centrifuging the removed oil and water to separate the purified oil from the water.
2. The process according to claim 1, comprising the further step of heating said mixture during the course of its circulation in said closed circuit.
3. The method according to claim 2, comprising the further step of cooling the refined oil.
4. A process for the purification of vegetable oils containing mucilaginous substances which comprises the steps of:
   (a) forming a mixture of oil and water containing from about 5% to about 20% water by volume;
   (b) forming a closed circuit containing said mixture;
   (c) continuously introducing said mixture into said closed circuit;
   (d) continuously circulating said mixture in said closed circuit;
   (e) continuously emulsifying said mixture during the course of its circulation through said closed circuit;
   (f) at least partially separating the oil from the water during the course of its circulation in said closed circuit;
   (g) continuously removing oil and water from said closed circuit at a total flow rate equal to the total flow rate at which said mixture is introduced, oil being removed at a flow rate greater than the rate at which water is removed;
   (h) reintroducing oil obtained from said separating step into said closed circuit at a flow rate sufficient to maintain about equal volumes of oil and water therein; and
   (i) centrifuging the removed oil and water to separate the purified oil from the water.
5. The process according to claim 4, comprising the further steps of heating said mixture during the course of its circulation in said closed circuit and cooling said purified oil after said centrifuging step.
6. The process according to claim 4, comprising the further step of passing said oil and water through filtering material during the course of its circulation in said closed circuit.

References Cited by the Examiner

UNITED STATES PATENTS

| | | | |
|---|---|---|---|
| 1,737,402 | 11/29 | Ayres et al. | 260—420 |
| 2,069,187 | 1/37 | Kraybill | 260—428 |
| 2,206,210 | 7/40 | Thurman | 260—428 |
| 2,254,101 | 8/41 | Clayton | 260—425 |
| 2,525,602 | 10/50 | Mattikow | 260—420 |

FOREIGN PATENTS 509,627  2/55  Canada.

CHARLES B. PARKER, *Primary Examiner.*

ABRAHAM H. WINKELSTEIN, DANIEL D. HORWITZ, *Examiners.*